United States Patent [19]
Cymbal

[11] Patent Number: 5,509,324
[45] Date of Patent: Apr. 23, 1996

[54] INTERMEDIATE STEERING SHAFT

[75] Inventor: William D. Cymbal, Freeland, Mich.

[73] Assignee: General Motors Corporation, Detroit, Mich.

[21] Appl. No.: 340,913

[22] Filed: Nov. 17, 1994

[51] Int. Cl.$^6$ ...................................................... B62D 1/16
[52] U.S. Cl. ............................ 74/492; 464/172; 464/177; 403/377; 403/109; 403/374
[58] Field of Search ..................... 74/493, 492; 403/108, 403/109, 314, 350, 351, 352, 357, 367, 369, 376, 377, 380, 383, 374; 280/777; 464/172, 173, 179, 181, 177, 180, 101

[56]                     References Cited
                 U.S. PATENT DOCUMENTS

| | | | |
|---|---|---|---|
| 3,444,753 | 5/1969 | Runkle | 403/351 X |
| 3,773,371 | 11/1973 | Carlsson | 403/351 X |
| 4,105,346 | 8/1978 | Gelinas | 403/352 |
| 4,269,043 | 5/1981 | Kizu et al. | 64/11 R |
| 4,509,775 | 4/1985 | Arndt | 280/779 |
| 4,667,530 | 5/1987 | Mettler et al. | 74/493 |
| 4,833,936 | 5/1989 | Mariani et al. | 74/493 |
| 4,906,122 | 3/1990 | Barret et al. | 403/314 X |
| 4,911,034 | 3/1990 | Kulczyk et al. | 74/492 |
| 5,152,627 | 10/1992 | Arnold | 403/109 |
| 5,427,468 | 6/1995 | Mellenbern | 403/350 |

Primary Examiner—Charles A. Marmor
Assistant Examiner—Saul Rodriguez
Attorney, Agent, or Firm—Saul Schwartz

[57]                     ABSTRACT

An intermediate steering shaft for a motor vehicle steering system including a polygonal tubular shaft, a polygonal solid shaft telescopically slidably disposed in the tubular shaft, and a twist lock for clamping a side of the solid shaft against a side of the tubular shaft to eliminate angular lash between the solid and tubular shafts. The twist lock includes a sleeve rotatably supported on the tubular shaft, a window in the tubular shaft, a plug in the window having an end bearing against a side of the solid shaft, a cantilever spring on the plug, and an actuator on the sleeve. In an open position of the twist lock, the actuator is remote from the cantilever spring and the solid and tubular shafts are freely telescopically slidable relative to each other. The sleeve is rotatable to effect a closed position of the twist lock in which the actuator flexes the cantilever spring to bias the end of the plug against the solid shaft and, consequently, a side of the solid shaft against a side of the tubular shaft.

4 Claims, 2 Drawing Sheets 5,509,324

INTERMEDIATE STEERING SHAFT

FIELD OF THE INVENTION

This invention relates to an intermediate steering shaft in a motor vehicle steering system.

BACKGROUND OF THE INVENTION

Intermediate steering shafts in motor vehicle steering systems commonly include a polygonal solid shaft telescopically slidably mounted in a polygonal tubular shaft. Clearance between the solid and tubular shafts for low friction telescopic sliding to facilitate installation of the intermediate steering shaft on a vehicle is also a source of angular lash between the solid and tubular shafts. To reduce angular lash, prior intermediate steering shafts, such as described in U.S. Pat. No. 4,509,775, issued 9 Apr. 1985 and assigned to the assignee of this invention, include springs which bias a side of the solid shaft against a side of the tubular shaft but which also induce friction which makes installation of the intermediate steering shaft on a vehicle more difficult.

SUMMARY OF THE INVENTION

This invention is a new and improved intermediate steering shaft for a motor vehicle steering system including a polygonal tubular shaft, a polygonal solid shaft telescopically slidably disposed in the tubular shaft, and a twist lock for clamping a side of the solid shaft against a side of the tubular shaft to eliminate angular lash between the solid and tubular shafts. In a preferred embodiment, the twist lock includes a sleeve rotatably supported on the tubular shaft, a window in the tubular shaft perpendicular to the longitudinal centerline thereof, a plug in the window having an end bearing against a side of the solid shaft, a cantilever spring on the plug, and an actuator on the sleeve. In an open position of the twist lock, the actuator is remote from the cantilever spring and the solid and tubular shafts are freely telescopically slidable relative to each other. The sleeve is rotatable to effect a closed position of the twist lock in which the actuator flexes the cantilever spring to bias the end of the plug against the solid shaft and, consequently, a side of the solid shaft against a side of the tubular shaft. The cantilever spring has a detent notch thereon and an edge of the actuator defines a detent which seats in the detent notch to retain the twist lock in the closed position.

DESCRIPTION OF A PREFERRED EMBODIMENT

Figure 1:
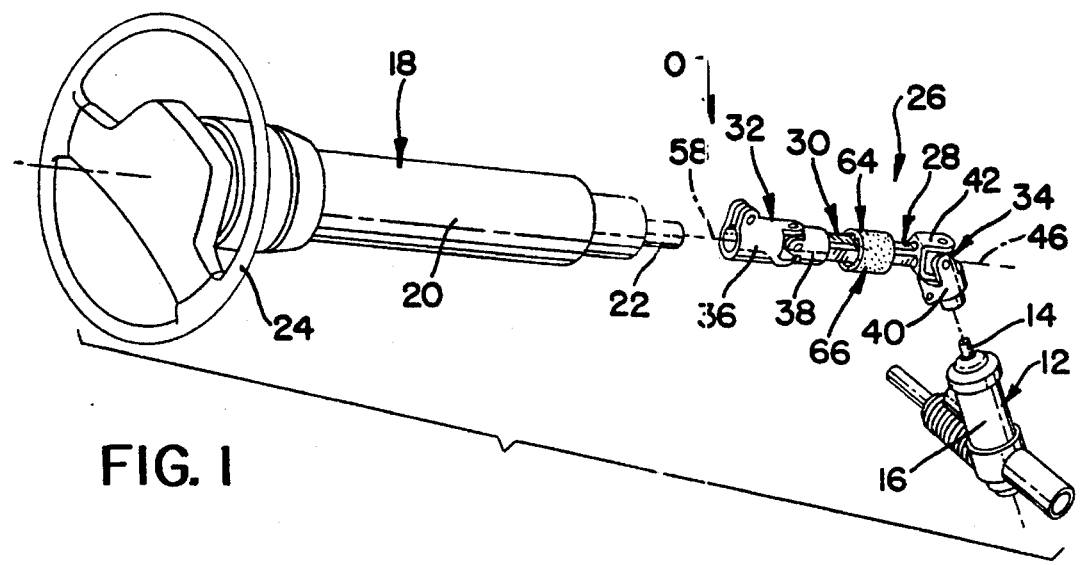
FIG. 1 is a fragmentary, schematic perspective view of a motor vehicle steering system having an intermediate steering shaft according to this invention.

Referring to FIG. 1, a motor vehicle steering system 10 includes a steering gear 12 having an input shaft 14 rotatably supported on a housing 16 of the steering gear. The housing 16 is mounted on a chassis, not shown, of a motor vehicle outside of a passenger compartment thereof and contains internal rack and pinion gearing, not shown, which converts rotation of the input shaft 14 to linear bodily movement of a rack bar connected to steerable wheels of the motor vehicle.

A steering column 18 of the steering system 10 includes a tubular mast jacket 20, a steering shaft 22 rotatably supported on the mast jacket, and a steering wheel 24 rigidly connected to the steering shaft 22 at the top of the mast jacket. The steering column 18 is supported inside a passenger compartment, not shown, of the motor vehicle with a lower end of the steering shaft protruding forward of a panel defining the front of the passenger compartment. The steering shaft 22 is connected to the steering gear input shaft 14 by an intermediate steering shaft 26 according to this invention.

The intermediate steering shaft 26 includes a polygonal solid shaft 28, a polygonal tubular shaft 30, an upper universal joint 32, and a lower universal joint 34. The upper universal joint 32 includes a yoke 36 clamped to the steering shaft 22, a yoke 38 welded or otherwise rigidly attached to an end of the tubular shaft 30, and a spider, not shown, between the yokes. The lower universal joint 34 includes a yoke 40 clamped to the steering gear input shaft 14, a yoke 42 welded or otherwise rigidly attached to an end of the solid shaft 28, and a spider, not shown, between the yokes.

As seen best in FIGS. 2–5, the solid shaft 28 has a plurality of flat sides 44A–C which define a triangle in a plane perpendicular to a longitudinal centerline 46 of the solid shaft, i.e. in cross section. A notch 48 in the flat side 44A of the solid shaft has a bottom 50 and a pair of sides 52A–B. The flat sides 44A–C intersect at a corresponding plurality of longitudinal edges 54A–C of the solid shaft which define segments of a cylindrical surface having a radius $R_1$, FIG. 5, from the longitudinal centerline 46.

The tubular shaft 30 has a plurality of flat sides 56A–C which define a triangle in a plane perpendicular to a longitudinal centerline 58 of the tubular shaft. A rectangular window 60 in the flat side 56A of the tubular shaft has a pair of side edges 62A–B perpendicular to the centerline 58 of the tubular shaft. The flat sides 56A–C intersect at a corresponding plurality of longitudinal edges 63A–C of the tubular shaft which define segments of a cylindrical surface having a radius $R_2$, FIG. 5, from the longitudinal centerline 58 of the tubular shaft. The solid shaft is telescopically slidably disposed in the tubular shaft with the centerlines 46, 58 generally coincident and with sufficient dimensional clearance to minimize sliding friction.

A twist lock 64 of the intermediate steering shaft 26 includes a sleeve having a cylindrical wall 68 with an annular lip 70 at one end thereof. The inside diameter of the annular lip 70 defines a longitudinal bore 72 of the sleeve 66 having a radius generally equal to the radius $R_1$ of the longitudinal edges 54A–C of the solid shaft. The cylindrical wall 68 has an inner surface 74 the radius of which is generally equal to the radius $R_2$ of the longitudinal edges 63A–C of the tubular shaft.

Internally of the sleeve, the lip 70 defines an annular shoulder 76 at one end of the inner surface 74. At the other end of the sleeve 66, the cylindrical wall 68 is counterbored to define a thin wall segment 78 of the sleeve. An actuator 80 on the thin wall section 78 of the sleeve extends from an edge of the latter to a shoulder at the bottom of the counterbore and has a sharp edge defining a detent 82 on the actuator.

The sleeve 66 fits over a distal end 84 of the tubular shaft before the solid shaft 28 is inserted therein. The distal end 84 seats on the annular shoulder 76 with the window 60 located inside the thin wall section 78 of the sleeve and with the longitudinal edges 63A–C of the tubular shaft slidingly engaging the inner surface 74 of the sleeve to support the sleeve on the tubular shaft for rotation about the centerline 58 of the latter. The solid shaft 28 is then inserted in the distal end 84 of the tubular shaft 30 through the longitudinal bore 72 in the sleeve until the notch 48 registers with the window 60.

The twist lock further includes a plastic plug 86 having an integral cantilever spring 88 thereon. The plug 86 fits in the window 60 between the side edges 62A–B and is thereby supported on the tubular shaft for bodily movement radially relative to the centerline 58. An end 90 of the plug is engageable on the bottom 50 of the notch 48 in the solid shaft and a telescopic axial stroke of the solid shaft relative to the tubular shaft is limited by engagement of the sides 52A–B of the notch on the plug. An outboard side of the cantilever spring 88 defines a ramp 92, FIG. 5, which terminates at an outward facing detent notch 94 in the spring.

Figure 2:
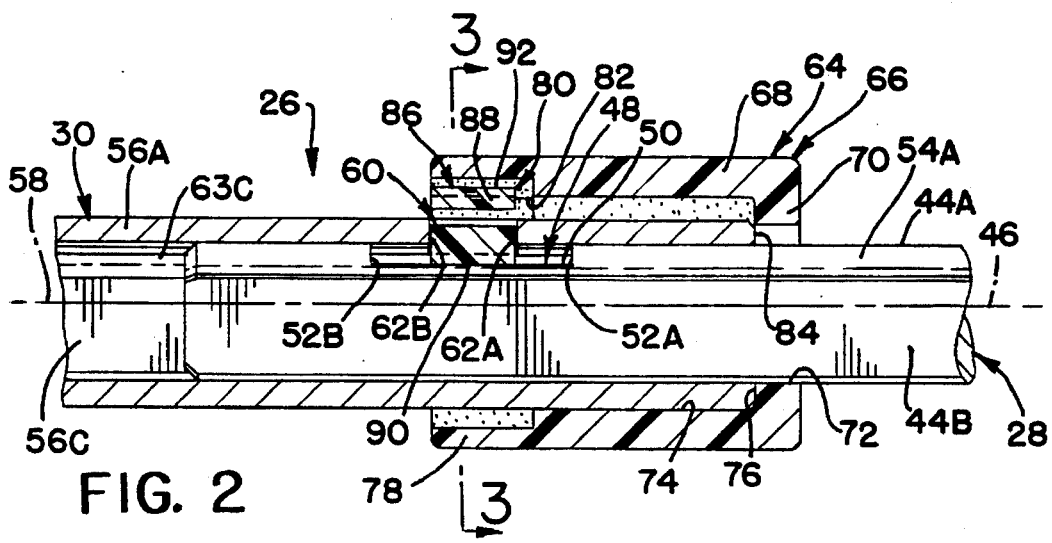
FIG. 2 is an enlarged, fragmentary longitudinal sectional view of the intermediate steering shaft according to this invention.
Figure 4:
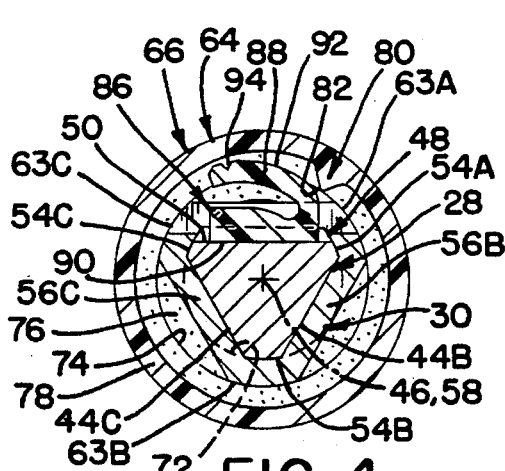
FIG. 4 is similar to FIG. 3 but showing elements of the intermediate steering shaft according to this invention in different relative positions.
Figure 3:
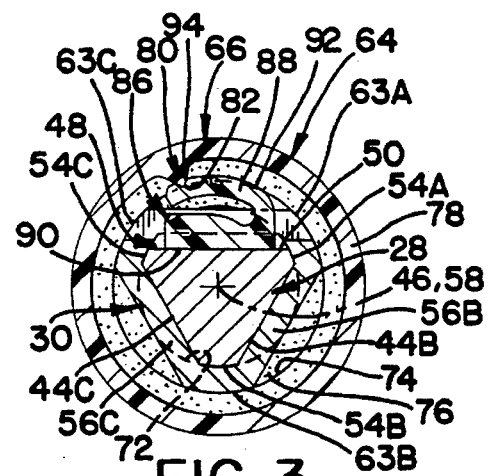
FIG. 3 is a sectional view taken generally along the plane indicated by lines 3—3 in FIG. 2.
Figure 5:
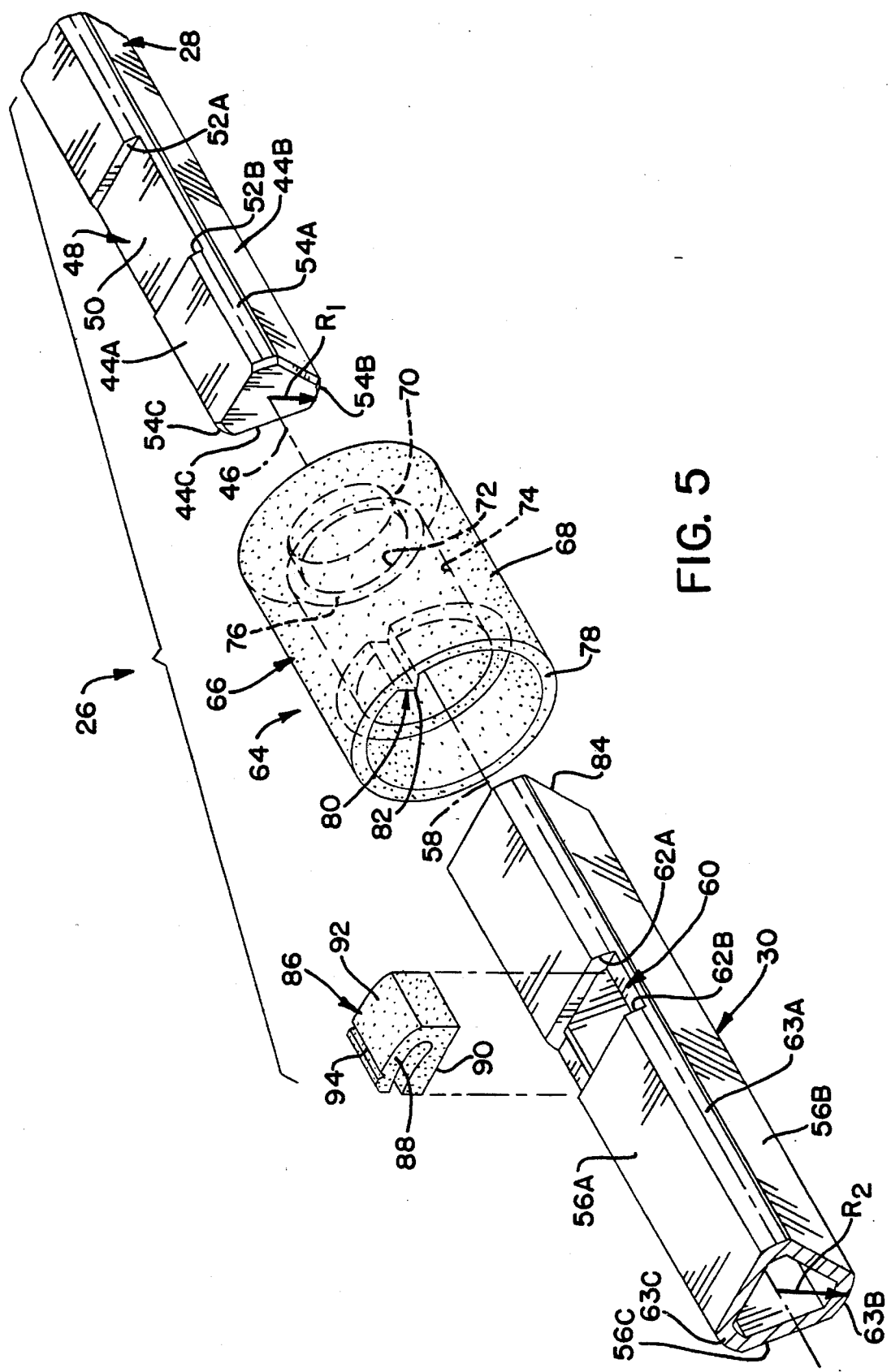
FIG. 5 is a fragmentary, exploded perspective view of the intermediate steering shaft according to this invention.

The twist lock 64 has an open position, FIG. 4, and a closed position, FIGS. 2–3. In the open position, the actuator 80 is remote from the ramp 92 so that there is no force reaction between the plug 86 and the solid shaft 28. In that circumstance, the solid shaft is freely telescopically slidable relative to the tubular shaft with minimal friction through the aforesaid axial stroke so that an installer can easily foreshorten the intermediate steering shaft for insertion between the shafts 14, 22 and then extend the intermediate steering shaft for attachment of the yokes 40, 36 to the shafts 14, 22.

The twist lock 64 is transitioned from the open to the closed position after the yokes 40, 36 are clamped to the shafts 14, 22 by manual counterclockwise rotation of the sleeve 66, FIGS. 3–4, relative to the tubular shaft 30. Such rotation of the sleeve causes the actuator 80 to engage the ramp 92 on the cantilever spring 88 and progressively flex the spring. Flexure of the spring 88 biases the end 90 of the plug 86 against the bottom 50 of the notch 48 and the flat sides 44B–C of solid shaft 28 against the flat sides 56B–C, respectively, of the tubular shaft.

The closed position of the twist lock is achieved when the detent 82 on the actuator 80 seats in the detent notch 94 in the cantilever spring. In that circumstance, the bias of the spring on the solid shaft 28 is maximum and the solid and tubular shafts are effectively rigidly clamped together inside the sleeve for angular lash-free torque transfer therebetween. In the direction of the centerlines 46, 58, the rigid connection between the solid and tubular shafts does not adversely impact the operation of the intermediate steering shaft because the positions of the steering shaft 22 and the steering gear input shaft 14 in that same direction are also fixed relative to each other.

The embodiments of the invention in which an exclusive property or privilege is claimed are defined as follows:

1. A telescopic steering shaft comprising:

a polygonal tubular shaft connected by a first universal joint to a first one of a steering shaft and a steering gear input shaft, a polygonal solid shaft telescopically slidably disposed in said polygonal tubular shaft and rotatable as a unit therewith and connected by a second universal joint to a second one of said steering shaft and said steering gear input shaft, and a twist lock on said polygonal tubular shaft manually actuated between an open position in which said polygonal solid shaft is freely telescopically slidable relative to said polygonal tubular shaft and a closed position in which said twist lock forces a side of said polygonal solid shaft against a side of said polygonal tubular shaft so that torque transfer therebetween is angular lash-free, said twist lock including a sleeve supported on said polygonal tubular shaft for rotation about a longitudinal centerline thereof, a window in a first side of said polygonal tubular shaft, a plug in said window shiftable radially relative to said longitudinal centerline of said polygonal tubular shaft having an end engageable on a first side of said polygonal solid shaft for applying a force thereto perpendicular to a longitudinal centerline of said polygonal solid shaft whereby a second side of said polygonal solid shaft is forced against a second side of said polygonal tubular shaft, a cantilever spring on said plug, and an actuator on said sleeve engageable on said cantilever spring to flex said cantilever spring and bias said plug against said first side of said polygonal solid shaft when said sleeve is manually rotated to a first position thereof corresponding to said closed position of said twist lock from a second position thereof corresponding to an open position of said twist lock.

2. The intermediate steering shaft recited in claim 1 further comprising:

a detent notch in said cantilever spring, and a detent on said actuator seated in said detent notch in said first position of said sleeve thereby to retain said sleeve in said first position thereof.

3. The intermediate steering shaft recited in claim 2 wherein:

said polygonal tubular shaft has a triangular cross section, and said polygonal solid shaft has a corresponding triangular cross section.

4. The intermediate steering shaft recited in claim 3 further comprising:

a notch in said first side of said polygonal solid shaft having a bottom engaged by said end of said plug and a pair of sides on opposite sides of said plug so that a telescopic axial stroke of said polygonal solid shaft relative to said polygonal tubular shaft in opposite directions is limited by engagement of each of said sides of said notch on said plug.

\* \* \* \* \*